United States Patent [19]

Risner

[11] Patent Number: 4,551,056
[45] Date of Patent: Nov. 5, 1985

[54] AUTOMATIC HANDRAIL FOR PLATFORM LIFT

[75] Inventor: Melvin G. Risner, Carey, Ohio

[73] Assignee: REB Manufacturing, Inc., Carey, Ohio

[21] Appl. No.: 528,393

[22] Filed: Sep. 1, 1983

[51] Int. Cl.⁴ .............................................. B60P 1/46
[52] U.S. Cl. .................................... 414/539; 182/113; 414/921
[58] Field of Search ............... 414/539, 540, 545, 921; 187/9 R; 182/113

[56] References Cited

U.S. PATENT DOCUMENTS

| | | |
|---|---|---|
| 408,626 | 8/1889 | Jones . |
| 417,395 | 12/1889 | Roeth . |
| 490,344 | 1/1893 | Farquharson . |
| 519,066 | 5/1894 | Krehbiel . |
| 808,076 | 12/1905 | Felkner et al. . |
| 1,105,705 | 8/1914 | Senter . |
| 1,136,581 | 4/1915 | Biltgen . |
| 3,072,215 | 1/1963 | Rush .............................. 182/2 |
| 3,648,720 | 3/1972 | Kornahrens ..................... 137/351 |
| 3,702,645 | 11/1972 | Shaw ............................. 187/18 |
| 3,737,009 | 6/1973 | Stoddard ........................ 187/17 |
| 3,847,292 | 11/1974 | Williams et al. . |
| 3,888,463 | 6/1975 | O'Brien et al. ................. 254/10 C |
| 3,893,576 | 7/1975 | Casady . |
| 4,198,188 | 4/1980 | Perkins .......................... 414/545 |
| 4,214,849 | 7/1980 | Downing ........................ 414/545 |
| 4,252,491 | 2/1981 | Hock .............................. 414/540 |
| 4,281,744 | 8/1981 | Koerber ......................... 187/9 R |
| 4,482,284 | 11/1984 | Robbins et al. ................ 414/921 X |

Primary Examiner—Robert G. Sheridan
Attorney, Agent, or Firm—Hugh Adam Kirk

[57] ABSTRACT

This disclosure concerns an automatic handrail for a platform lift which automatic handrail is pivoted along one side of the foldable platform along an axis perpendicular to that of the hinge of the platform for oscillating movement from an inoperative position parallel to the plane of the platform when the platform is in its vertical inoperative position, into a vertical operative position in a plane orthogonal to the plane of the platform when the platform is in its horizontal operative position. This movement of the handrail is affected by an oscillating cam arm anchored to the pivotal connection of the reciprocating motor for oscillating the platform, which cam arm engages a cam plate mounted on the side of the pivoted handrail. The handrail is normally urged into its inoperative position parallel to the plane of the platform by a resilient means. A stop may be provided for limiting the movement of the handrail into its vertical operative position.

12 Claims, 9 Drawing Figures

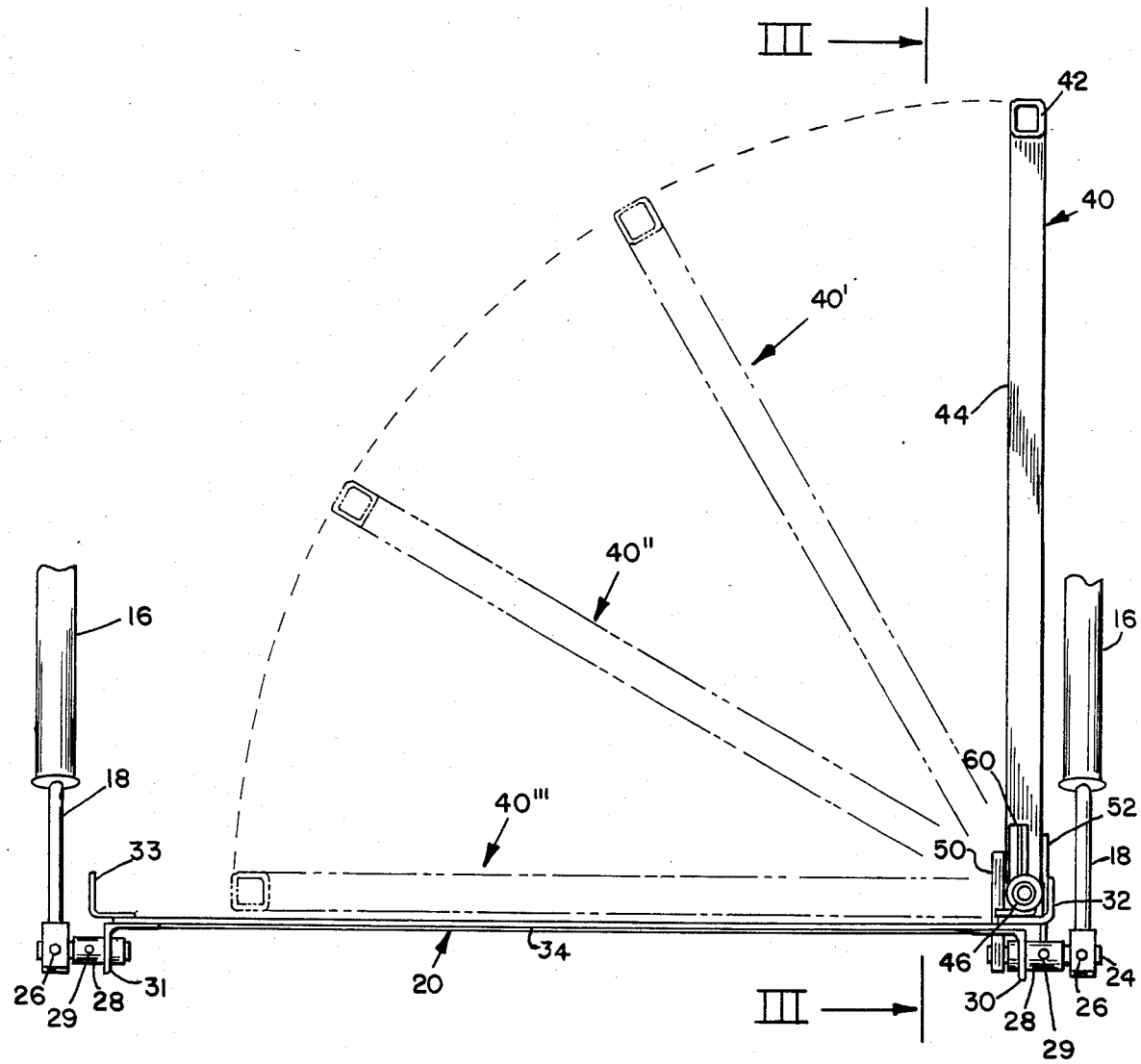
Fig II

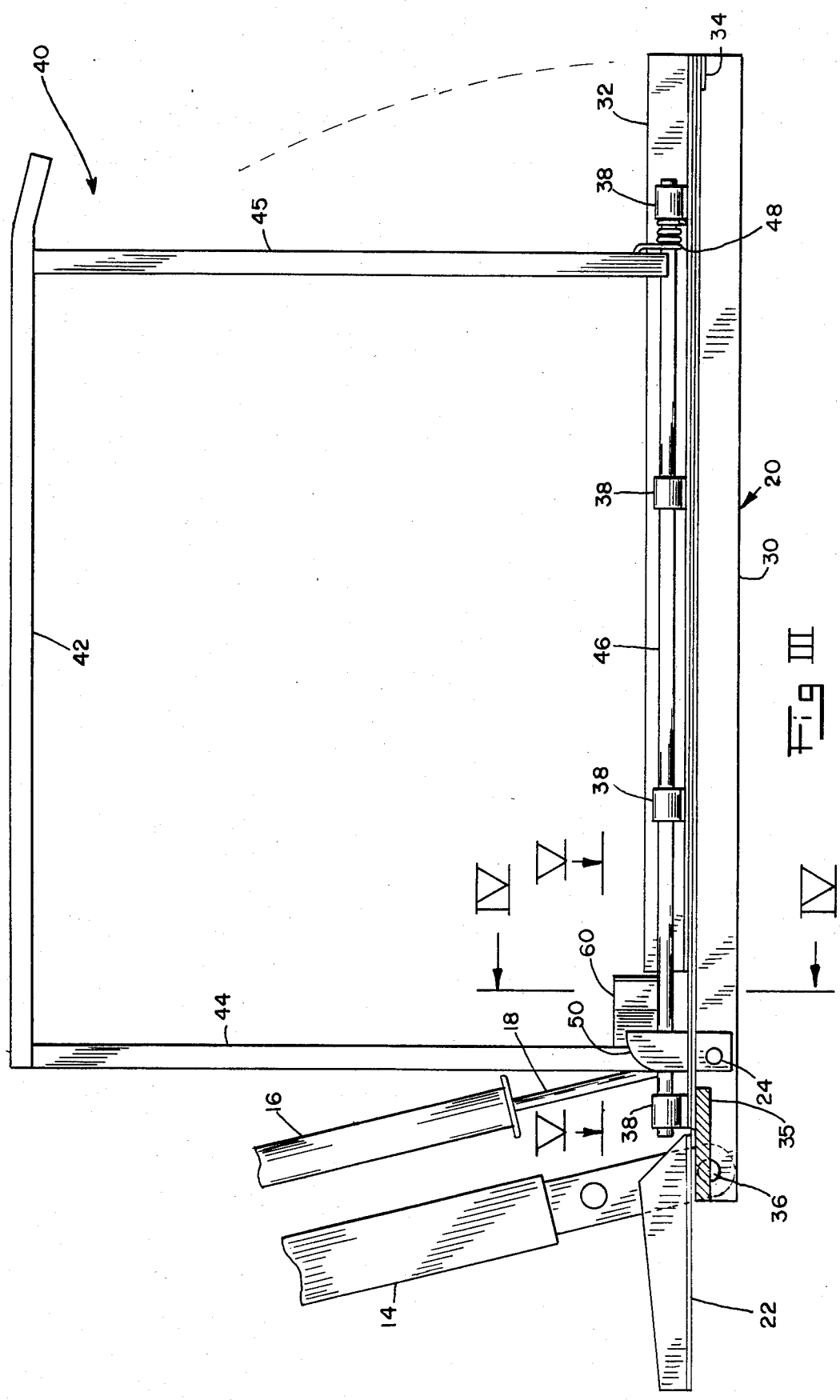

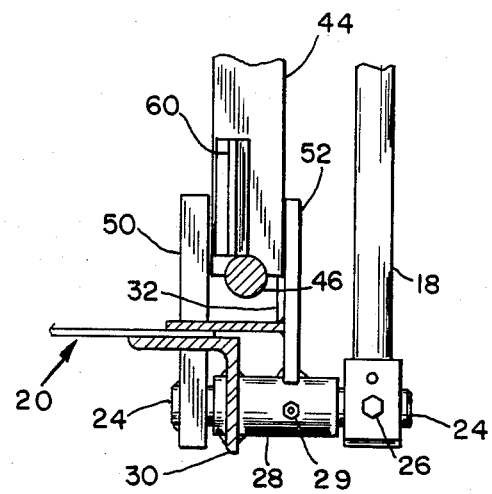
Fig IV
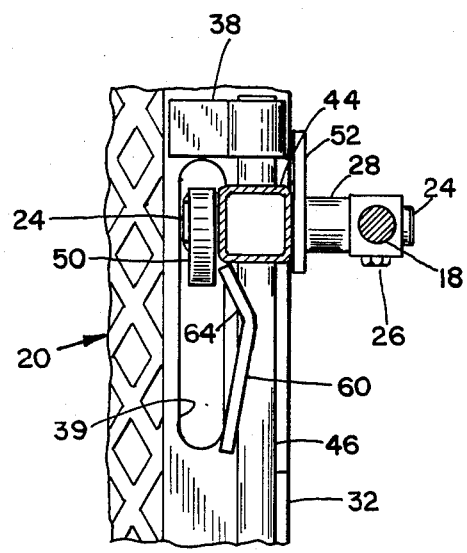
Fig V

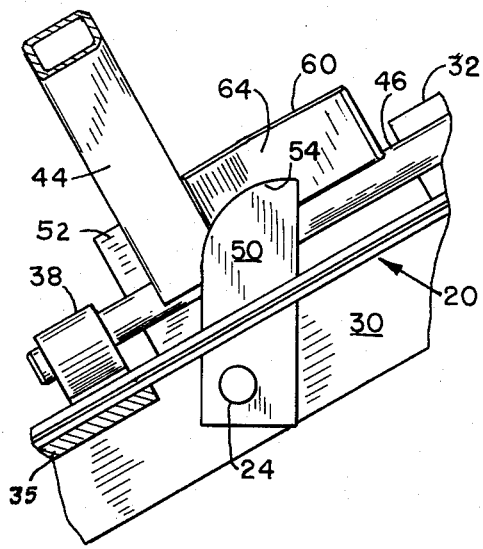
Fig VI
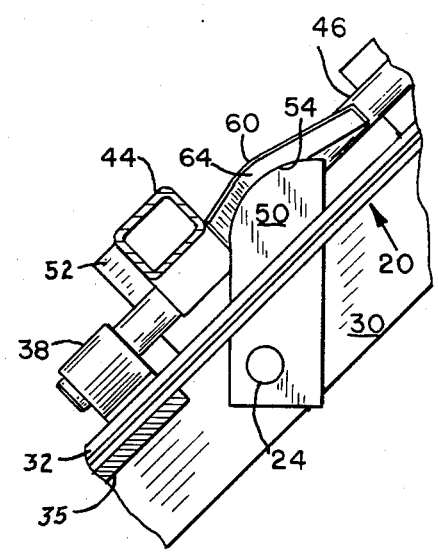
Fig VII
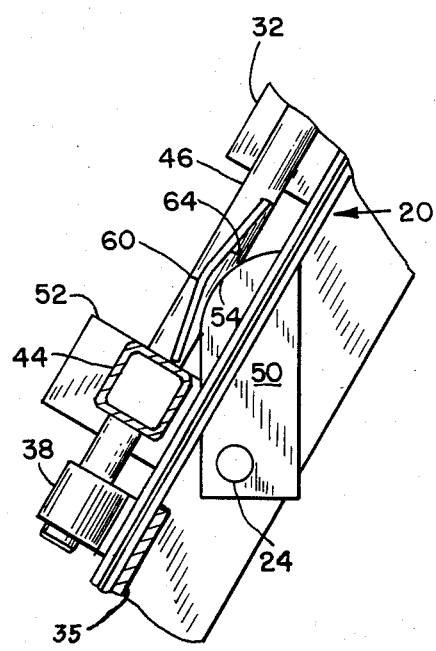
Fig VIII
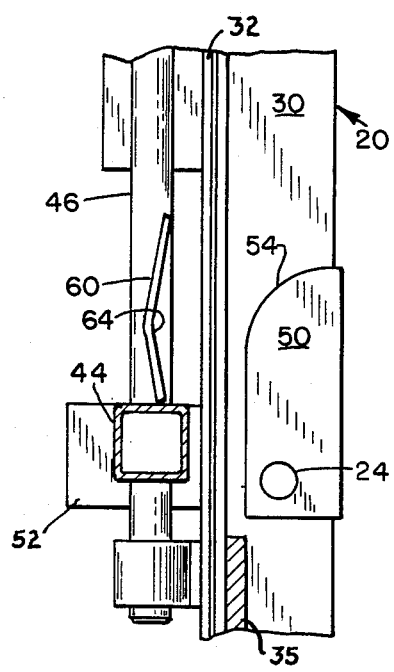
Fig IX

AUTOMATIC HANDRAIL FOR PLATFORM LIFT

BACKGROUND OF THE INVENTION

This invention is an improvement in the platform lift of Meldahl et al U.S. Pat. No. 4,056,203 issued Nov. 1, 1977 by adding thereto a handrail which automatically moves from an inoperative folded position into an operative vertical position.

Although automatically operative handrails have been provided for platform lifts, even including ones which are automatically moved into operative position when the platform is moved into its operative position, there is no known mechanism which can be simply and economically adapted for the above mentioned platform lift without the addition of relatively complicated mechanisms.

SUMMARY OF THE INVENTION

Generally speaking, the automatic handrail of this invention is a handrail for a lift platform attached to vehicles, such as employed for invalids and wheelchairs. This handrail automatically folds against the planar surface of the platform at the same time the platform folds into a vertical and/or inoperative position in order to save space, such as in the vehicle on which the lift platform may be mounted. The automatic handrail of this invention, however, is particularly adapted for the platform lift disclosed in the above mentioned U.S. Pat. No. 4,056,203 of Meldahl et al issued Nov. 1, 1977 in which the mechanism for folding the platform from a vertical inoperative position into a horizontal operative position and vice versa comprises a reciprocating motor, such as a hydraulic piston pivotally connected to the platform on an axis parallel to that of the axis of the hinge for the platform. This pivotal connection comprises a stub shaft keyed to the outer end of the oscillating motor piston to which stub shaft is also keyed a cam arm which oscillates through about a 90° angle as the platform oscillates through a 90° angle, and which cam arm engages a cam surface of a plate on the automatic handrail unit to raise and lower the handrail unit around its hinged axle along one side or edge of the platform orthogonal to the pivotal axis of the hinge for the platform. This cam arm acts against the action of a resilient means, such as a helical spring around the hinged axle for the handrail unit, which spring normally urges the handrail unit into its inoperative or collapsed position onto the platform of the lift with its plane parallel to the plane of the platform of the lift. Thus, as long as the platform is in its horizontal position, the handrail is in its vertical operated position, and the cam does not permit the resilient means to fold down the handrail unit into its inoperative position until the cam arm on a pivot oscillates into its position parallel with the plane of the platform as the platform folds into its vertical inoperative position.

The handrail unit may comprise in its operative position a vertical rectangular frame having a horizontal upper handrail portion supported by two integral parallel vertical legs, the lower ends of which legs are anchored to the base or hinged horizontal axle parallel to the handrail portion. The cam arm on the pivot stub shaft for the reciprocating motor has an arcuate edge which engages a wavy surface on the cam plate anchored to an adjacent leg and hinged axle of the handrail unit. These cams are so configured that there is no interference between the operation of the handrail and the folding-up of the platform. There also may be provided a stop for the handrail unit in its vertical or operative position on the opposite side of the hinged axle from the cam arm, when the cam arm is projecting above the surface of the platform of the lift pushing the handrail unit into its vertical operative position. Since the cam arm pushes upwardly on the cam surface of the cam plate on the handrail assembly, this arm projects through a slot in the edge of the platform on the inner side of the hinged axle of the handrail unit.

OBJECTS AND ADVANTAGES

It is an object of this invention to produce a simple, effective, efficient, economic, and reliable automatic handrail for a platform lift.

Another object is to provide such an automatic handrail for a foldable platform lift which is operable by the mechanism for folding the platform from an operative to an inoperative position and vice versa for correspondingly moving the handrail into an operative and inoperative position, respectively.

BRIEF DESCRIPTION OF THE VIEWS

The above mentioned and other features, objects and advantages, and a manner of attaining them are described more specifically below by reference to an embodiment of this invention shown in the accompanying drawings wherein:

FIG. I is a perspective view of a foldable wheelchair platform lift, similar to that shown in the above mentioned Meldahl et al patent for a van-type vehicle (shown in dot-dash lines), the platform of which lift has an automatic handrail unit, shown in its operative position, according to a preferred embodiment of this invention;

FIG. II is an enlarged view of an end of the platform of the lift and handrail unit shown in FIG. I, with parts of the reciprocating motor means for moving the handrail and platform, and showing in dot-dash lines three positions the handrail taken when folded into its inoperative position parallel to the platform, which dot-dash line positions correspond to the handrail positions shown in FIGS. VI, VII and VIII or IX, respectively;

FIG. III is a side view of the handrail unit taken in the direction of the arrows along the platform section line III—III in FIG. II;

FIG. IV is a further enlarged sectional view taken along line IV—IV in FIG. III, showing the cam arm and stop for controlling the operation of the handrail unit; FIG. V is a further enlarged sectional plan view of the cam arm and stop for controlling the operation of the handrail unit taken along line V—V in FIG. III; and FIGS. VI, VII, VIII and IX are enlarged side views of the cam arm and cam plate as shown in the lower lefthand corner of FIG. III, but showing the platform being moved and folded from its horizontal operative position into its vertical inoperative position through 30°, 45°, 75° and 90° with the horizontal, respectively.

DETAILED DESCRIPTION OF THE PREFERRED EMBODIMENT

Foldable Platform Lift

Figure 1:
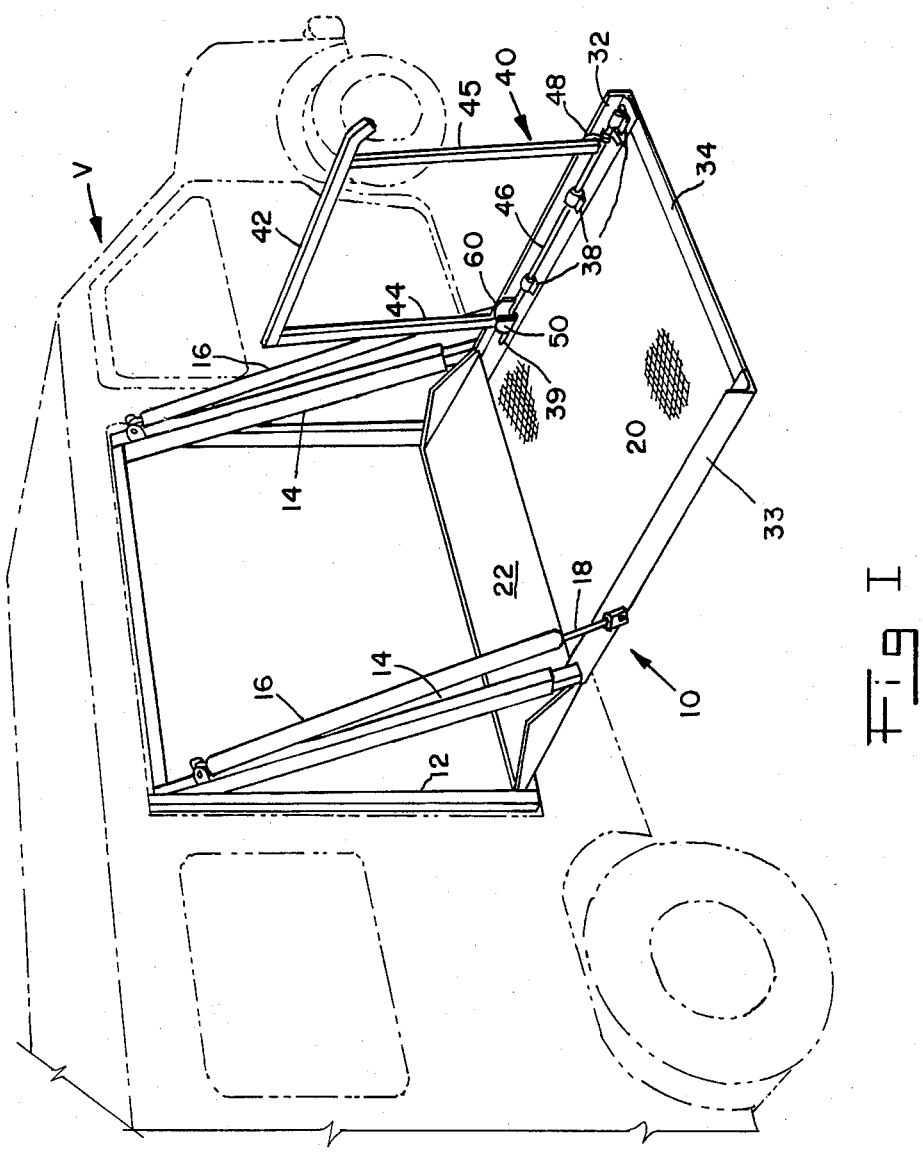

Referring first to FIG. I there is partly shown in dot-dash lines a vehicle V, a side doorway of which has mounted therein a foldable platform lift 10, such as for wheelchairs, which lift 10 is of the type disclosed in the above mentioned Meldahl et al U.S. Pat. No. 4,056,203 issued Nov. 1, 1977. This lift 10 generally comprises a frame 12 mounted in the doorway of the vehicle, which frame has pivoted along its top edge a pair of depending telescopic arms 14 adjacent which are pivoted, near the top of the arms 14, one or a pair of reciprocating motors 16, such as hydraulic cylinders and their corresponding pistons 18. The outer ends of the pistons or piston rods 18 are pivotally connected to a foldable platform 20 which platform is hinged along its rear edge to the lower end of the telescopic extensions 14, so that when the reciprocating motors 16 are completely retracted, the platform 20 will be folded into a vertical inoperative position and swung back inside the side wall of the vehicle V substantially in the same vertical plane as the frame 12. The extension of the reciprocating motors or hydraulic pistons 18 in the cylinder 16 from the vertical inoperative position of the platform 20 into the position shown in FIG. I causes the telescopic frames 14 to swing outwardly from the edge of the vehicle so that when the platform 20 is unfolded into is horizontal operative position shown in FIG. I, further extension and retraction or reciprocation of the hydraulic reciprocating motor pistons 18 can raise and lower the platform 20 in a horizontal position from that of level with the floor of the vehicle V shown in FIG. I to that of level with the ground or road upon which the vehicle stands. There is shown herein a hinged bridge 22, which automatically folds down from a vertical position parallel to the platform 20 when in its inoperative position to the operative horizontal position shown in FIG. I, to bridge the gap between the floor of the vehicle and the inner edge of the platform 20 when the platform has been swung out from the vehicle into the position shown in FIG. I.

The outer and lower ends of the reciprocating pistons 18 are keyed to stub shafts 24 (see also FIGS. II, IV and V) such as by bolts 26 through said shafts 24, which stub shafts are journalled in bearings 28 welded to the parallel angle brackets or members 30 and 31 that form the underside edges of the platform assembly 20. The bearings 28 may be provided with zerk or other types of fittings 29 for their lubrication. This platform 20 also may be reinforced by additional angle brackets 32 and 33 which form upwardly extending flanges along the same parallel side edges of the platform 20. Furthermore, the platform 20 may be framed by cross-member 34 along its front edge, and cross-member 35 along its rear edge (see FIG. III) adjacent which member 35 the platform 20 is hinged by pivots 36 to the ends of the telescopic arms 14.

For further information regarding the operation of the platform lift 10 and the folding of its platform 20, reference is made to said Meldahl et al U.S. Pat. No. 4,056,203 mentioned above.

Automatic Handrail

There is also shown in FIGS. I, II and III the automatic handrail unit 40 which herein comprises a handrail portion 42 supported by a pair of parallel legs 44 and 45, the lower ends of which legs 44 and 45 are anchored to a hinge shaft 46 that may be journalled in a plurality of bearings 38 anchored along and to the upper side rail 32, such as by bolts, welding or other means. Around one end of the shaft 46 there is provided a resilient means, such as helical spring 48, the opposite ends of which spring engage the platform rail 32 and handrail leg 45, respectively, to normally urge the handrail unit 40 into its inoperative or collapsed position on the top of the platform 20 and shown in dotted lines at 40''' in FIG. II and in full lines in FIGS. VIII and IX. Thus, in order to raise the handrail unit 40 into its operative position shown in full lines in FIGS. I, II and III, there must be some positive action against the handrail unit and the torsion spring 48. This action and movement is provided by means of a cam arm 50 keyed to the shaft 24 which in turn is keyed to the end of the reciprocating motor piston rod 18. This cam arm 50 operates from a position shown in FIG. IX to that shown in FIGS. I through V, namely oscillatable over an arc of about 90°, which arm 50 extends upwardly through a slot 39 in the platform 20 (see FIGS. I and V) on the opposite side of the shaft 46 from that of the reciprocating piston rod 18. Thus the raising of the arcuate outer edged cam arm 50 into its vertical position shown in FIGS. I through V, shows the side of this arm 50 against the lower end of the support leg 44 above the shaft 46 to maintain the handrail unit in its operative vertical position. If desired, there may be provided a stop means or plate 52 (see FIGS. II, IV and V) welded to the side rail 32 to limit the vertical operative position of the handrail unit 40 and prevent it from swinging outwardly beyond its normal vertical position.

In order for the smooth operation of the handrail unit 40 from its inoperative position 40''' in FIG. II and FIG. IX into its operative position shown in full lines in FIGS. I through V, there is also provided a cam plate 60 having a wavy cam surface 64, which plate 60 is welded into the lower lefthand corner of the frame of the handrail unit 40 shown in FIGS. I and III to the support leg 44 and shaft 46. The curved outer edge 54 of the cam arm 50 engages this wavy surface 64 of cam plate 60 to raise the handrail unit 40 from its inoperative position parallel with the plane of the platform 20 into its vertical operating position shown in full lines in FIGS. I through V only after the platform 20 has moved away from its vertical inoperative position sufficiently to provide space therefor, i.e. after about 15° movement of the platform 20 with respect to the vertical (see FIG. VIII). Then the handrail unit 40 is raised as shown in the successive steps in FIGS. VII and VI, which correspond respectively approximately to positions 40'' and 40' of the handrail unit shown in FIG. II. Accordingly, the arcuate surface 54 on the cam arm 50 together with the wavy surface 64 on the cam plate 60 must be formed so as to avoid any interference with the movement of the platform 20 as the handrail unit 40 is moved into its inoperative position by means of a helical spring 48, and vice versa. If desired, and preferably, the surfaces of the cam arm 50 and plate 60 may be provided with a lubricant to remove as much friction as possible between these parts.

It should be understood that, if desired, a similar cam mechanism can be provided for the stub shaft journalled in the bearing 28 on the opposite side of the platform 20 for the handrail instead, or an additional handrail may be so provided, without departing from the scope of this invention.

While there is described above the principles of this invention in connection with specific apparatus, it is to be clearly understood that this description is made only by way of example and not as a limitation to the scope of this invention.

I claim:

1. An automatic handrail for a foldable lift platform comprising:

(A) a lift platform hinged along one side thereof for oscillatable movement from a vertical inoperative position to a horizontal operative position, and vice versa;

(B) reciprocal motor means having its operative means pivotally journalled to said platform along an axis parallel to the axis of said hinge for oscillating said platform;

(C) a cam arm attached to said pivotally journalled motor operative means for oscillation with the movement of said platform;

(D) a handrail means in a plane having a shaft along its lower side journalled to said platform along an axis orthogonal to the axis of said hinge for said platform for oscillating movement from an inoperative position in a plane parallel to the plane of said platform when said platform is in its vertical inoperative position to an operative horizontal position in a plane orthogonal to the plane of said platform when said platform is in its horizontal operative position, and vice versa;

(E) resilient means normally urging said handrail means into its inoperative position parallel to the plane of said platform, and (F) cam plate means on said handrail means for engagement by said cam arm for moving said handrail means into its vertical operative position against the action of said resilient means when said platform is moved into its horizontal operative position.

2. An automatic handrail according to claim 1 including a stop means on said platform for limiting the movement of said handrail means in its vertical position.

3. An automatic handrail according to claim 1 wherein said shaft on said handrail means is journalled along one side of said platform.

4. An automatic handrail according to claim 1 wherein said resilient means comprises a helical spring around said shaft of said handrail means.

5. An automatic handrail according to claim 1 wherein said cam plate means has a wavy surface.

6. An automatic handrail according to claim 1 wherein said cam arm has an arcuate outer edge.

7. In a foldable lift platform having a reciprocating motor means for pivoting said platform along one edge thereof from a vertical inoperative position to a horizontal operative position and vice versa, and having an oscillatable shaft parallel to the axis of pivot of said platform and journalled in said platform, which shaft is anchored to the end of said reciprocating motor means and rotates in its journal in said platform during movement of said platform about said pivotal axis of said platform, the improvement comprising an automatic handrail for said platform which pivots around an axis orthogonal to the pivotal axis of said platform, said handrail and its operating mechanism comprising:

(A) an axle journalled in said platform orthogonal to said pivoting axis of said platform;

(B) a handrail and support fixed to said axle for movement from an inoperative position parallel to the plane of said platform when said platform is in its vertical inoperative position to an operative vertical position orthogonal to the plane of said platform when said platform is in its horizontal operative position, and vice versa;

(C) resilient means for normally urging said handrail and support into its inoperative position, and (D) cooperating cam means comprising a plate on said handrail support and on said shaft for urging said handrail and support into its vertical operative position against the urging of said resilient means as the platform is moved from its inoperative vertical to its operative horizontal position.

8. An automatic handrail according to claim 7 wherein said axle therefor is along a side of the said platform.

9. An automatic handrail according to claim 7 wherein said resilient means comprises a helical spring around said axle for said handrail.

10. An automatic handrail according to claim 7 wherein said cooperating cam means comprises a wavy surface plate on said axle and an arcuate cam lever anchored to said shaft.

11. An automatic handrail according to claim 7 including a stop means for limiting the oscillating movement of said handrail and support in its vertical operative position.

12. An automatic handrail according to claim 7 wherein said cam lever extends through a slot in the plane of said platform.

* * * * *

UNITED STATES PATENT AND TRADEMARK OFFICE
CERTIFICATE OF CORRECTION

PATENT NO. : 4,551,056
DATED : November 5, 1985
INVENTOR(S) : Melvin G. Risner

It is certified that error appears in the above-identified patent and that said Letters Patent are hereby corrected as shown below:

Column 2, line 40, change "taken" to - - takes - - .
Column 3, line 20, change "is" to - - its - - .
Column 6, line 23, after "and" insert - - a lever - - .

Signed and Sealed this

Fourth Day of February 1986

[SEAL]

Attest:

DONALD J. QUIGG

Attesting Officer

Commissioner of Patents and Trademarks